(12) United States Patent
Chien

(10) Patent No.: US 9,766,457 B2
(45) Date of Patent: Sep. 19, 2017

(54) HEAD-UP DISPLAY DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hung-Chang Chien, Hsinchu County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/016,435

(22) Filed: Feb. 5, 2016

(65) Prior Publication Data
US 2017/0139208 A1 May 18, 2017

(30) Foreign Application Priority Data

Nov. 17, 2015 (CN) .......................... 2015 1 0789225

(51) Int. Cl.
| | | |
|---|---|---|
| G02B 27/14 | (2006.01) | |
| G02B 27/01 | (2006.01) | |
| G02B 27/00 | (2006.01) | |

(52) U.S. Cl.
CPC ..... *G02B 27/0149* (2013.01); *G02B 27/0006* (2013.01); *G02B 2027/0159* (2013.01); *G02B 2027/0163* (2013.01)

(58) Field of Classification Search
CPC ................ G02B 27/01; G02B 27/0101; G02B 27/0103; G02B 27/0149
USPC .................................. 359/630–633; 345/7, 9
See application file for complete search history.

(56) References Cited

U.S. PATENT DOCUMENTS

2014/0225811 A1* 8/2014 Killguss ............... G02B 7/1827
345/7
2015/0362731 A1* 12/2015 Hack .................. G02B 27/0149
359/632

* cited by examiner

*Primary Examiner* — William Choi
(74) *Attorney, Agent, or Firm* — Li & Cai Intellectual Property (USA) Office

(57) ABSTRACT

A head-up display device includes a housing, a base, a projecting board assembly, a protecting cover and a driving mechanism. The projecting board assembly has a holder and a projecting board. The protecting cover is movably arranged on the projecting board assembly, and can be used to cover the projecting board or uncover to expose the projecting board. The projecting board assembly is rotatably arranged above the base by the driving mechanism, and the driving mechanism can drive the projecting board assembly at a storing position or a displaying position. The driving mechanism can drive the protecting cover to be guided by the first guiding mechanism, so as to move the protecting cover. Otherwise, the driving mechanism can pull down the protecting cover by the second guiding mechanism to expose the projecting board, and make the projecting board assembly in the displaying position.

18 Claims, 9 Drawing Sheets

HEAD-UP DISPLAY DEVICE

TECHNICAL FIELD

The present invention provides a head-up display (HUD) device, particularly an HUD device having a rotary projecting board assembly.

BACKGROUND ART

A head-up display (HUD) is a device for projecting instrument-related information onto a windshield. Compared to a traditional instrument panel, the HUD enables a driver to see required important information without lowering his/her head. Therefore, the driver can see instrument-related information while viewing road conditions.

HUDs having a rotary projecting board assembly have been successively proposed, where vehicle information is displayed by the projecting board assembly which is rotated upwards and extended outward, and when the use of the projecting board assembly is stopped, the projecting board assembly is rotated downwards and retracted into a housing of an instrument panel assembly. A conventional HUD is not arranged with a protecting cover, so it is easily exposed to sunshine or adhered with dust, thereby resulting in the damage to the projecting board. However, because the projecting board assembly has a large area, arrangement of a protecting cover is relatively difficult and certainly results in a complex structure and increased cost.

In view of the above disadvantages, after extensive research in conjunction with theoretical knowledge, the inventors provide this invention that is reasonably designed and effectively improves upon the above disadvantages.

SUMMARY OF THE INVENTION

The objective of the present invention is to provide a HUD device, which has a protecting cover, thereby achieving an effect of protecting a projecting board to prevent the projecting board from being exposed to sunshine or adhered with dust. In addition, the protecting cover is relatively easily disposed, so as to simplify the structure and reduce cost.

In order to achieve the above objective, the present invention provides a HUD device, comprising: a housing, formed with an opening; a base, disposed below the housing; a projecting board assembly, comprising a holder and a projecting board disposed at the holder; a protecting cover, movably disposed on the projecting board assembly, wherein the protecting cover can cover or expose the projecting board, and a first guiding mechanism and a second guiding mechanism are disposed between the protecting cover and the housing; and a driving mechanism, wherein the projecting board assembly is rotatably disposed above the base through the driving mechanism, the driving mechanism is capable of driving the projecting board assembly to move between a storing position located at an opening of the housing and a displaying position located outside the housing, and the driving mechanism is selectively connected to the protecting cover; wherein the driving mechanism can drive the protecting cover to be moved and guided by the first guiding mechanism, such that the protecting cover engages the holder of the projecting board assembly, and additionally, the driving mechanism can pull down the protecting cover under guidance of the second guiding mechanism, such that the projecting board is exposed, and the projecting board assembly is positioned at the displaying position.

Preferably, the first guiding mechanism comprises a first guiding groove and a first guiding post, the first guiding groove is disposed at the housing, the first guiding post is disposed at the protecting cover, and the first guiding post is slidably disposed in the first guiding groove.

Preferably, the second guiding mechanism comprises a second guiding groove and a second guiding post, the second guiding groove is disposed at the housing, the second guiding post is disposed at the protecting cover, and the second guiding post is slidably disposed in the second guiding groove.

Preferably, the driving mechanism comprises a motor, a first gear set, a swing arm, and a second gear set, one end of the swing arm is connected to the motor through the first gear set, and the other end of the swing arm is connected to the holder of the projecting board assembly through the second gear set.

Preferably, the first gear set has a transmission shaft, and one end of the swing arm is connected to the transmission shaft, such that said one end of the swing arm is connected to the motor through the first gear set.

Preferably, the second gear set comprises a first rack, a second rack, and a gear, the first rack and the second rack are arc-shaped, the first rack is fixed to the other end of the swing arm, the second rack is fixed to one end of the holder, the second rack is engaged to the gear, and the first rack is selectively engaged to the gear along with swinging of the swing arm.

Preferably, a third guiding mechanism is disposed between the swing arm and the base, for guiding the swinging of the swing arm.

Preferably, the housing is formed with a connecting groove, the protecting cover has a connecting post, the connecting post is slidably disposed in the connecting groove, and a hook is movably disposed at the other end of the swing arm, and the hook is selectively hooked onto the connecting post, such that the swing arm is selectively connected to the protecting cover.

Preferably, the hook is connected to a slider, the slider is slidably disposed on the swing arm, one side of the hook is formed with a through hole for the connecting post to pass through, and a fourth guiding mechanism is disposed between the slider and the base, for guiding the slider and the hook to move.

Preferably, an engagement mechanism is disposed between the protecting cover and the holder of the projecting board assembly to selectively engage the protecting cover to the holder of the projecting board assembly.

Preferably, the engagement mechanism comprises an engagement groove and an engagement pin, the engagement groove is disposed at the holder of the projecting board assembly, the engagement pin is disposed at the protecting cover, and the engagement pin is selectively moved into the engagement groove to engage the protecting cover to the holder of the projecting board assembly.

In order to achieve the above objective, the present invention further provides a HUD device, comprising: a housing, formed with an opening; a projecting board assembly, comprising a holder and a projecting board, the projecting board being disposed on the holder, wherein the projecting board assembly is displaceable between a storing position and a displaying position, wherein when the projecting board assembly is located at the storing position, the projecting board is retracted within the housing, and wherein when the projecting board assembly is located at the displaying position, the projecting board is extended outside the housing through the opening; a protecting cover, configured to at least partially cover the opening, wherein an engagement mechanism is disposed between the protecting cover and the holder of the projecting board assembly to selectively engage the protecting cover to the holder of the projecting board assembly; and a driving mechanism, configured to drive the protecting cover to move, engage the protecting cover to the holder of the projecting board assembly through the engagement mechanism, and drive the projecting board assembly to move from the storing position to the displaying position.

Preferably, the engagement mechanism comprises an engagement groove and an engagement pin, the engagement groove is disposed at the holder of the projecting board assembly, the engagement pin is disposed at the protecting cover, and the engagement pin is selectively moved into the engagement groove to engage the protecting cover to the holder.

Preferably, when the projecting board assembly is located at the storing position, the projecting board disengages from the holder.

Preferably, when the projecting board assembly is driven to move from the storing position to the displaying position, the protecting cover engages the holder through the engagement mechanism and the projecting board assembly drives the protecting cover to move synchronously.

In order to achieve the above objective, the present invention further provides a HUD device, comprising: a housing, formed with an opening; a projecting board assembly, comprising a holder and a projecting board, the projecting board being disposed on the holder, wherein the projecting board assembly is displaceable between a storing position and a displaying position, wherein when the projecting board assembly is located at the storing position, the projecting board is retracted within the housing, and wherein when the projecting board assembly is located at the displaying position, the projecting board is extended outside the housing through the opening; a protecting cover, configured to at least partially cover the opening, and a first guiding mechanism and a second guiding mechanism being disposed between the protecting cover and the housing; and a driving mechanism, configured to drive the protecting cover to move under guidance of the first guiding mechanism and drive the protecting cover to rotate under guidance of the second guiding mechanism for exposing the opening, such that the projecting board is extended outside the housing through the opening.

Preferably, the first guiding mechanism comprises a first guiding groove and a first guiding post, the first guiding groove is disposed at the housing, the first guiding post is disposed at the protecting cover, and the first guiding post is slidably disposed in the first guiding groove.

Preferably, the second guiding mechanism comprises a second guiding groove and a second guiding post, the second guiding groove is disposed at the housing, the second guiding post is disposed at the protecting cover, and the second guiding post is slidably disposed in the second guiding groove.

Preferably, the driving mechanism comprises a motor, a gear set, and a swing arm, the motor is configured to drive the swing arm to rotate through the gear set, the swing arm is connected to the protecting cover, and the driving mechanism is configured to drive the protecting cover to move through the swing arm.

The present invention at least has the following advantages:

The projecting board assembly of the present invention comprises the holder and the projecting board, wherein the protecting cover can cover the projecting board of the projecting board assembly, thereby achieving the effect of protecting the projecting board to prevent the projecting board from being exposed to sunshine or adhered with dust. Since the protecting cover only covers the projecting board of the projecting board assembly, the protecting cover is more easily disposed and driven, thereby simplifying the structure and reducing cost.

Moreover, the second guiding mechanism is disposed between the protecting cover and the housing of the present invention. When the driving mechanism drives the projecting board assembly to move towards the displaying position, the protecting cover can be pulled down under guidance of the second guiding mechanism, such that the projecting board is exposed. Therefore, the protecting cover can be driven without other driving mechanisms, further simplifying the structure and reducing cost.

In order to further understand the features and technical content of the present invention, reference can be made to the detailed description and accompanying drawings of the present invention. However, the accompanying drawings are only provided for reference and illustration, and not intended to limit the present invention.

DETAILED DESCRIPTION OF THE PREFERRED EMBODIMENTS

Figure 1:
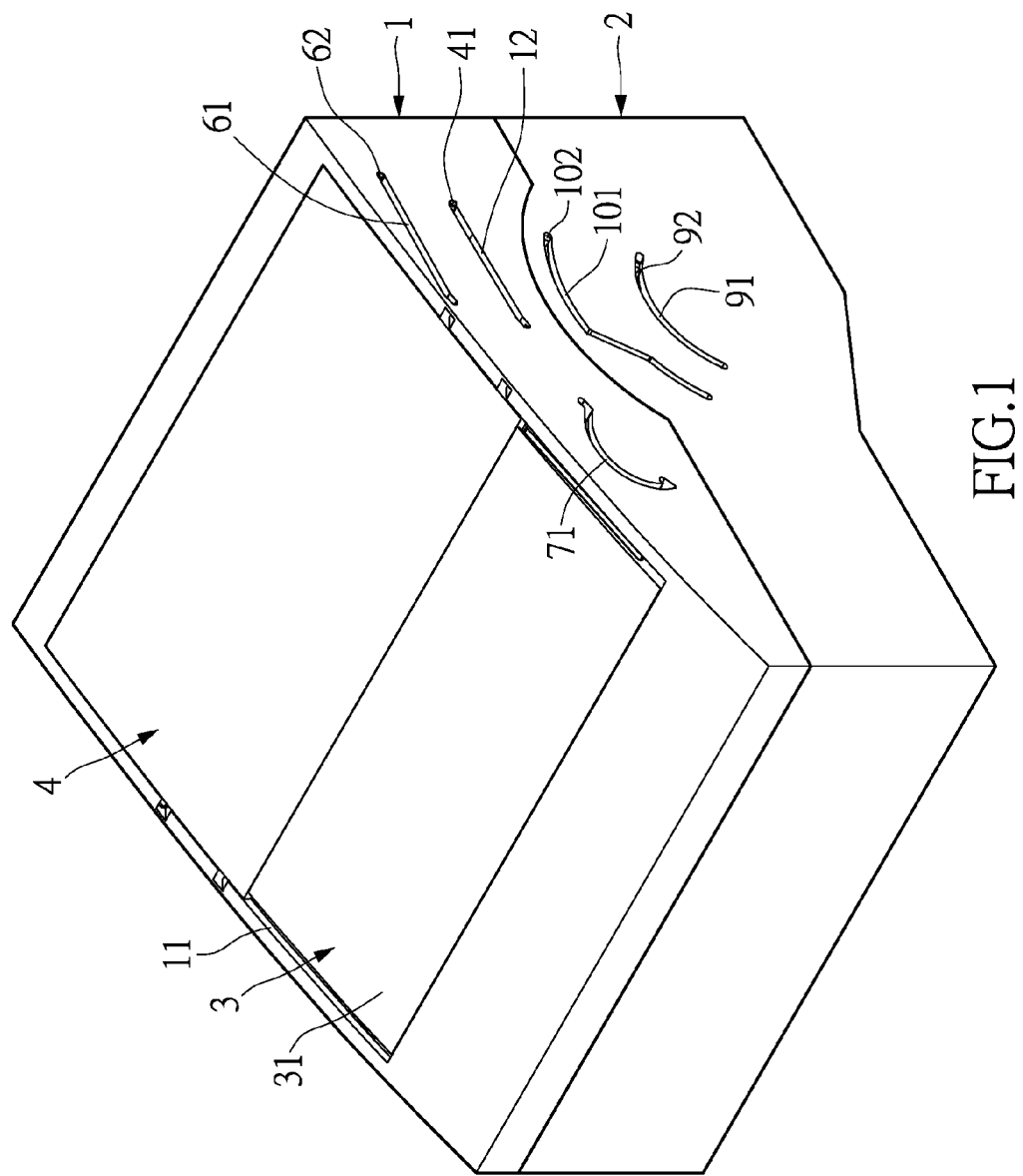
FIG. 1 is a perspective view of a HUD device of the present invention.
Figure 2:
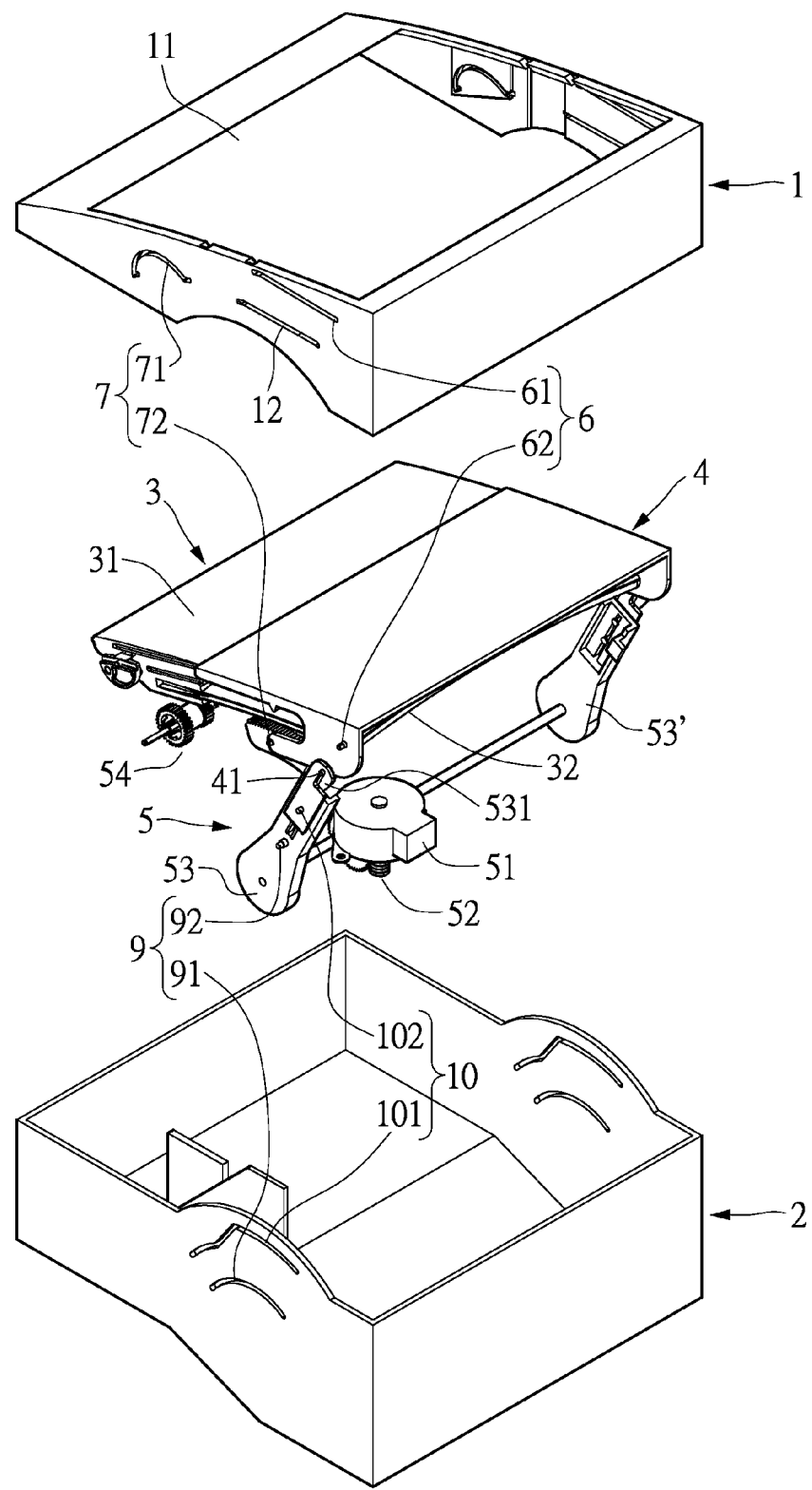
FIG. 2 is an exploded view of the HUD device of the present invention.

Referring to FIG. 1 and FIG. 2, the present invention provides a HUD device, particularly a HUD device having a rotary projecting board assembly and comprising a housing 1, a base 2, a projecting board assembly 3, a protecting cover 4, and a driving mechanism 5.

The housing 1 is hollow. The housing 1 may be a part of an instrument panel housing (e.g. a dashboard) or may be otherwise combined with the instrument panel housing. The housing 1 is formed with an opening 11 such that the projecting board assembly 3 can, through the opening 11, be rotated upwards and extended outside the housing 1 or be rotated downwards and retracted to be at the opening 11 of the housing 1. The base 2 is disposed below the housing 1. The housing 1 and the base 2 can be appropriately fixed onto a vehicle.

Figure 3:
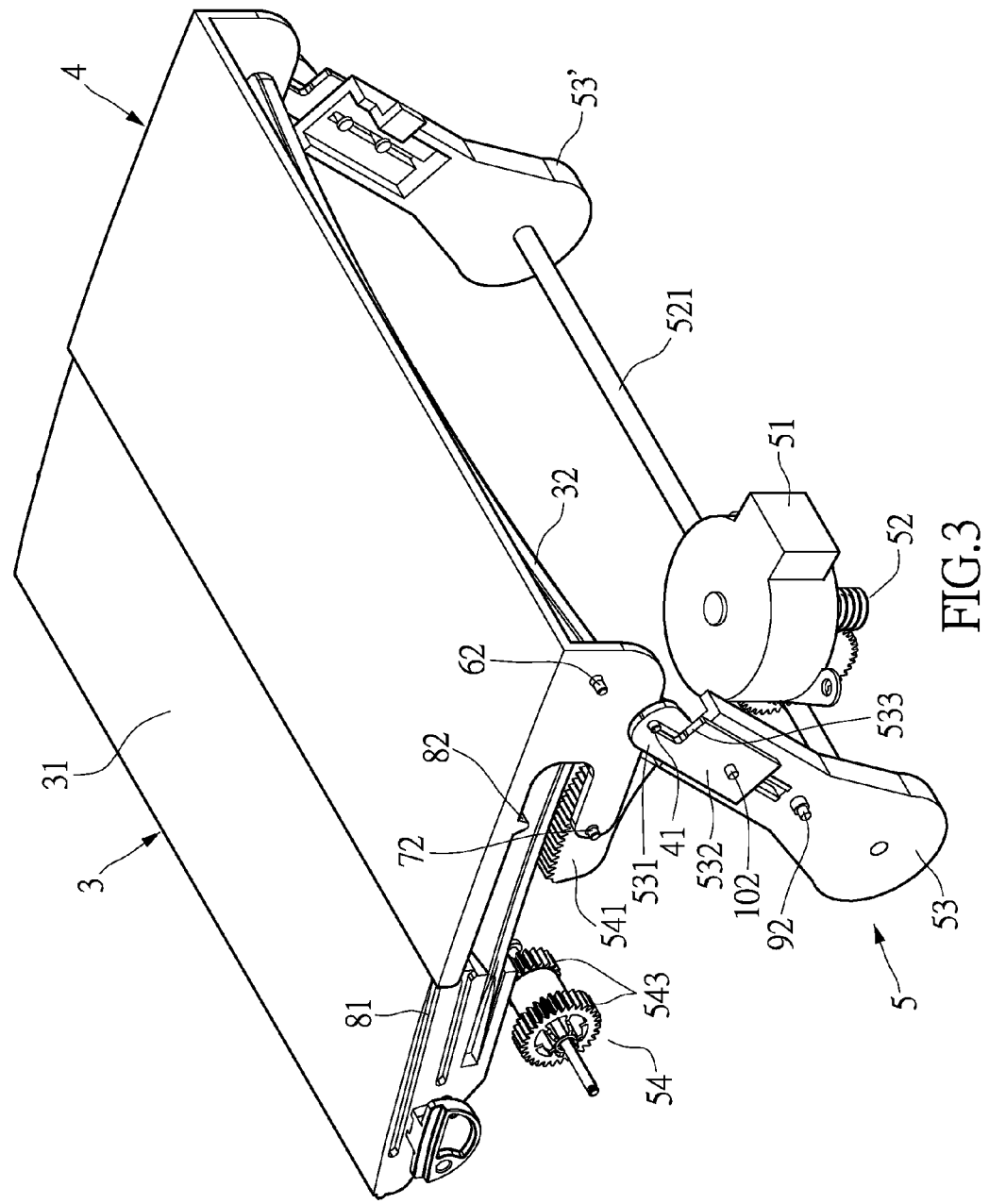
FIG. 3 is a perspective view of an internal structure of the HUD device of the present invention.
Figure 4:
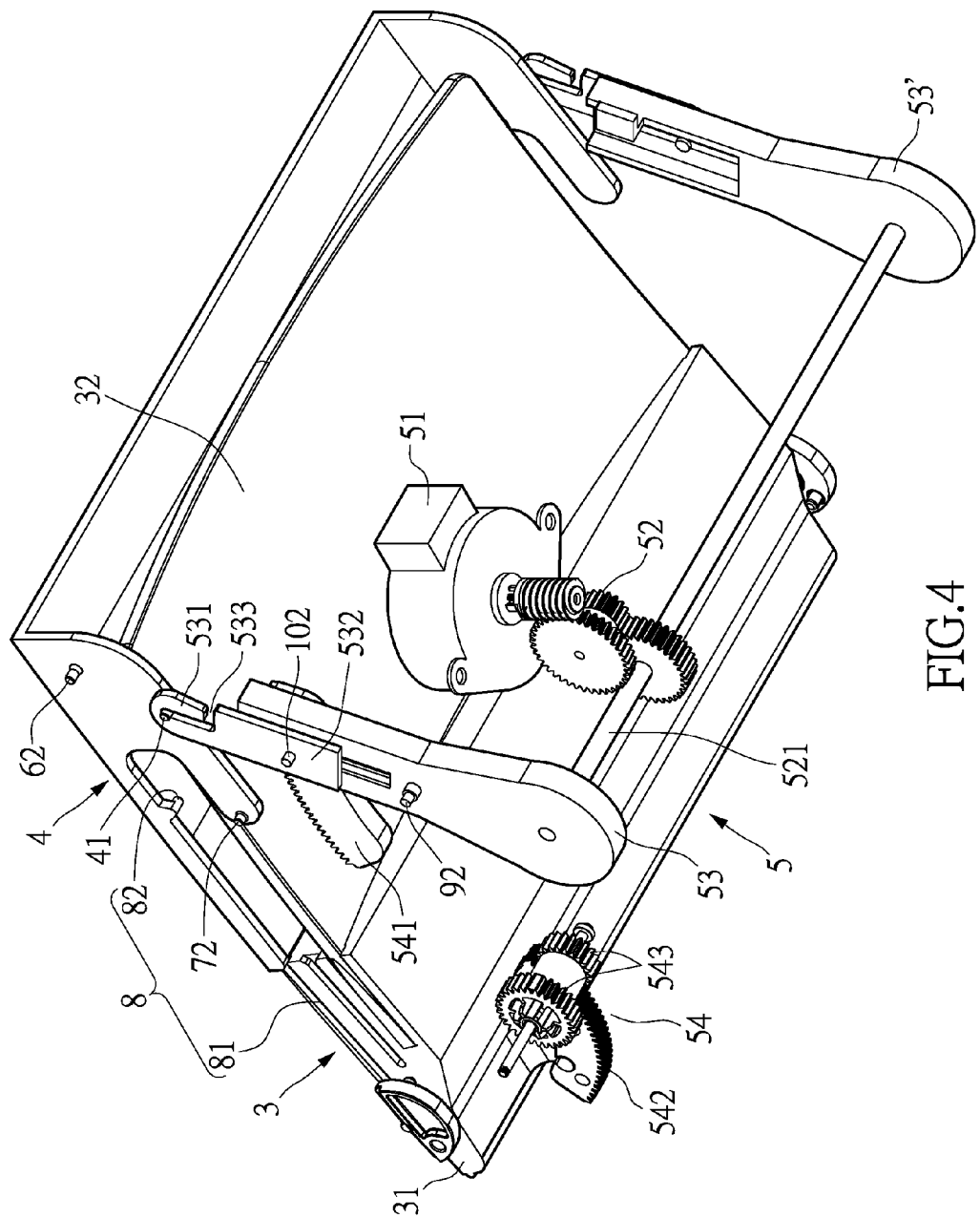
FIG. 4 is a perspective view of the internal structure of the HUD device of the present invention viewed from another angle.
Figure 5:
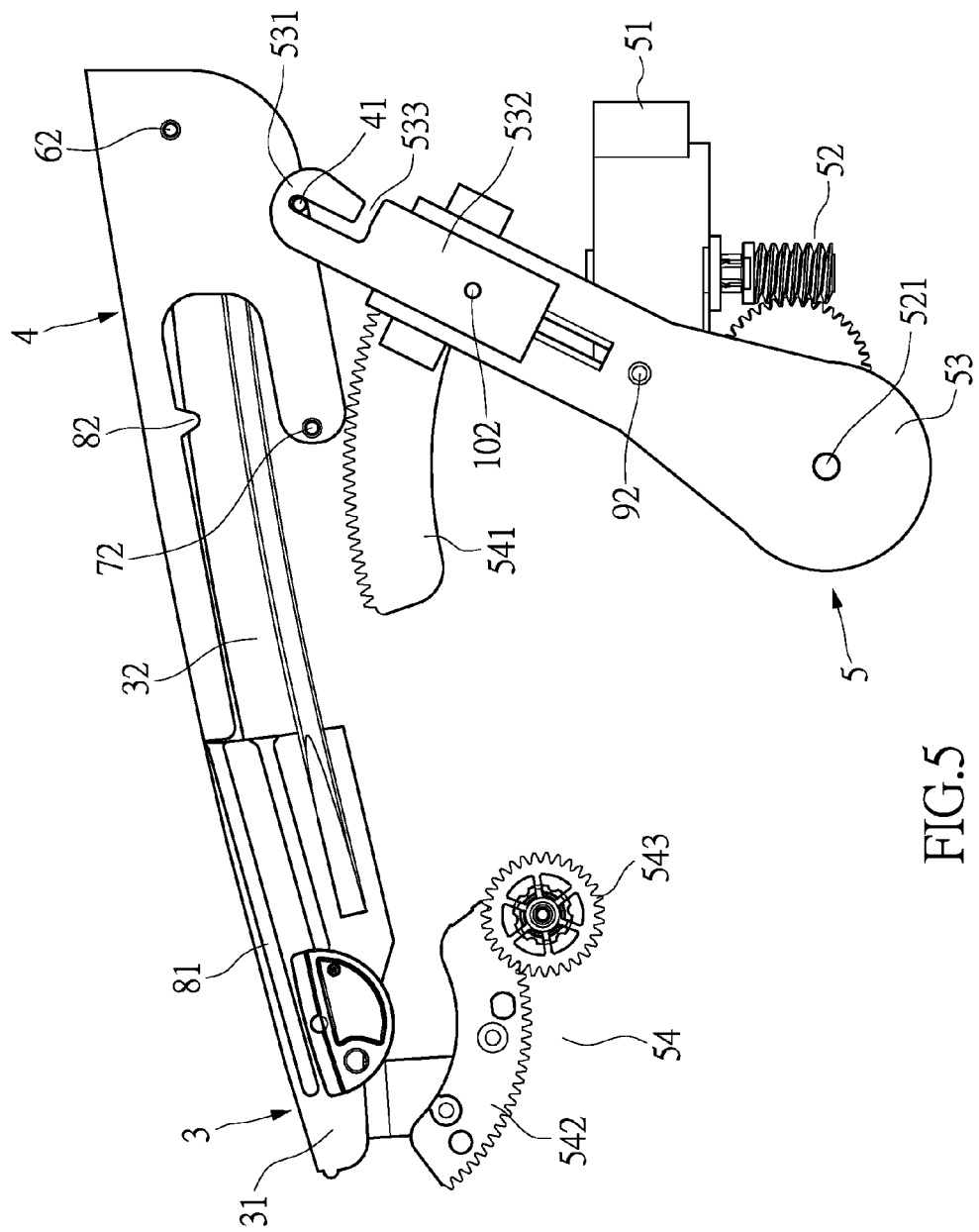
FIG. 5 is a plan view of the internal structure of the HUD device of the present invention.

Referring to FIG. 3 to FIG. 5, the projecting board assembly 3 comprises a holder 31 and a projecting board 32. The projecting board 32 is preferably, but not limited to, an arc board. The projecting board 32 is disposed on the holder 31, namely, one end of the projecting board 32 can be inserted into the holder 31 such that the projecting board 32 and the holder 31 are integrally connected, to facilitate using the holder 31 to drive the projecting board 32 to move synchronously. The holder 31 can be connected to the driving mechanism 5, such that the projecting board assembly 3 can be rotatably disposed above the base 2 through the driving mechanism 5.

The protecting cover 4 is a cover capable of covering the projecting board 32. The protecting cover 4 is movably disposed on the projecting board assembly 3. The protecting cover 4 can cover the projecting board 32 or expose the projecting board 32. Specifically, the protecting cover 4 may be moved towards the holder 31 such that the protecting cover 4 is located outside the holder 31, thereby exposing the projecting board 32; the protecting cover 4 may also be moved towards the projecting board 32 such that the protecting cover 4 covers the projecting board 32 to protect the projecting board 32.

A first guiding mechanism 6 and a second guiding mechanism 7 are disposed between the protecting cover 4 and the housing 1 (please refer to FIG. 2), and can used to sequentially guide the protecting cover 4 to move on the projecting board assembly 3, such that the projecting board 32 is exposed or covered by the protecting cover 4. The construction of the first guiding mechanism 6 and the second guiding mechanism 7 is not limited, and may be a combination of a guiding groove with a guiding post, or a combination of a guiding trail with a guiding block, or other existing guiding mechanisms.

In the present embodiment, the first guiding mechanism 6 (please refer to FIG. 2) comprises a first guiding groove 61 and a first guiding post 62. The first guiding groove 61 is disposed at the housing 1. The first guiding groove 61 may be disposed at two sides of the housing 1. The first guiding groove 61 is generally linear. The first guiding post 62 is disposed at the protecting cover 4. The first guiding post 62 may be disposed at two sides of the protecting cover 4. The first guiding post 62 may be slidably disposed in the first guiding groove 61. The first guiding mechanism 6 may guide the protecting cover 4 to move on the projecting board assembly 3, such that an upper portion of the projecting board 32 is exposed.

In the present embodiment, the second guiding mechanism 7 (also see FIG. 2) comprises a second guiding groove 71 and a second guiding post 72. The second guiding groove 71 is disposed at the housing 1. The second guiding groove 71 and the first guiding groove 61 are disposed spaced apart from each other. The second guiding groove 71 is closer to the holder 31 of the projecting board assembly 3 than the first guiding groove 61 is. The second guiding groove 71 may be disposed at two sides of the housing 1. The second guiding groove 71 is generally arc-shaped. The second guiding post 72 is disposed at the protecting cover 4. The second guiding post 72 may be disposed at two sides of the protecting cover 4. The second guiding post 72 is slidably disposed in the second guiding groove 71. The second guiding mechanism 7 may guide the protecting cover 4 to move above the projecting board assembly 3, such that the whole of the projecting board 32 is exposed.

An engagement mechanism 8 is further disposed between the protecting cover 4 and the holder 31 of the projecting board assembly 3, such that the protecting cover 4 can be selectively engaged to the holder 31 of the projecting board assembly 3. The construction of the engagement mechanism 8 is not limited. In the present embodiment, the engagement mechanism 8 comprises an engagement groove 81 and an engagement pin 82. The engagement groove 81 is disposed at the holder 31 of the projecting board assembly 3. The engagement pin 82 is disposed at the protecting cover 4. The engagement groove 81 may be disposed at two sides of the holder 31 of the projecting board assembly 3. The engagement pin 82 may also be disposed at two sides of the protecting cover 4. The engagement pin 82 is selectively moved into the engagement groove 81, such that the protecting cover 4 is selectively engaged to the holder 31 of the projecting board assembly 3.

Figure 6:
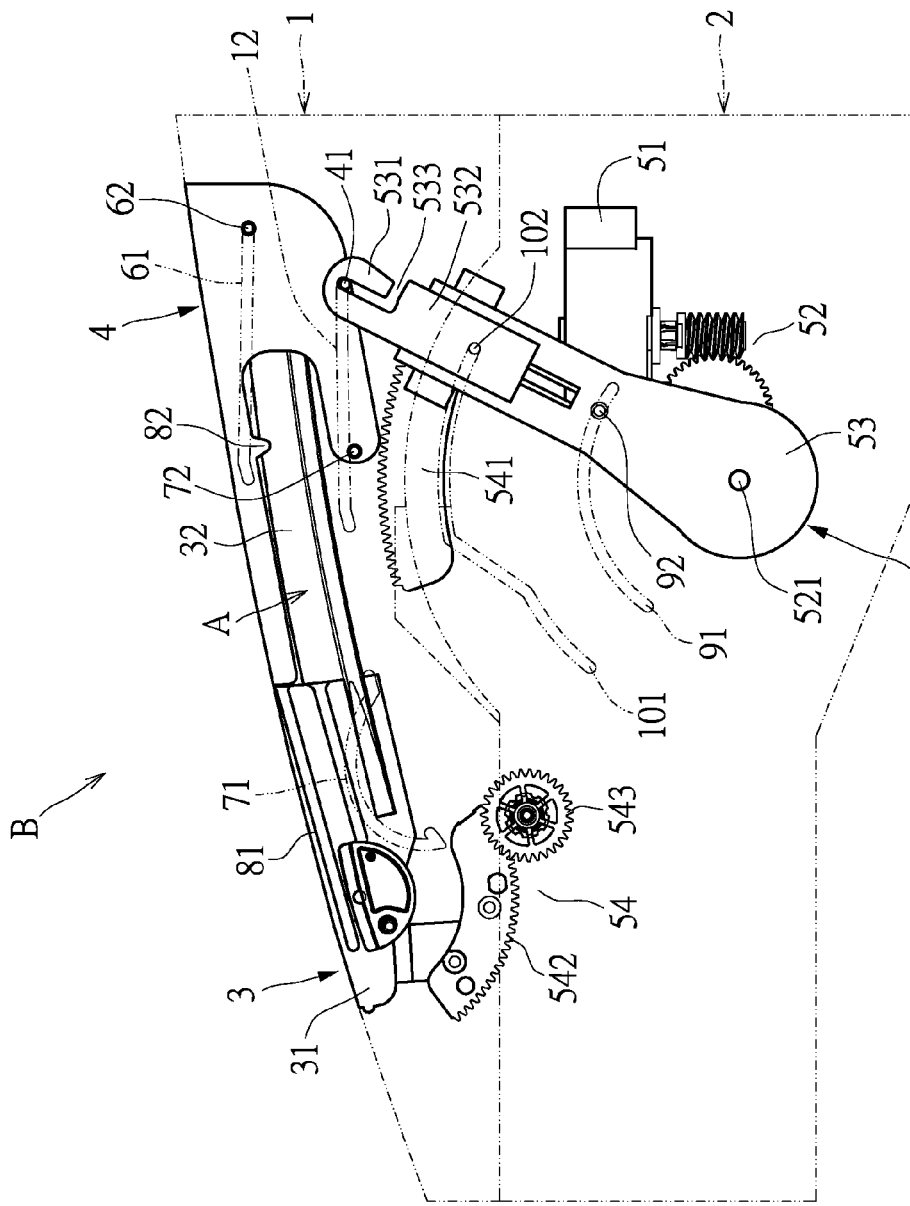
FIG. 6 is a schematic diagram (1) illustrating the action of the HUD device of the present invention.

The driving mechanism 5 is used to drive the projecting board assembly 3 to move between a storing position A and a displaying position B (as shown in FIG. 6). The storing position A is located at the opening 11 of the housing 1. The displaying position B is located outside the housing 1. The projecting board assembly 3 can be accommodated at the storing position A when not being used. The driving mechanism 5 is selectively connected to the protecting cover 4. The driving mechanism 5 can drive the protecting cover 4 to move under guidance of the first guiding mechanism 6 (also see FIG. 2), such that the protecting cover 4 is engaged to the holder 31 of the projecting board assembly 3, and then the driving mechanism 5 can pull down the protecting cover 4 under guidance of the second guiding mechanism 7 (also see FIG. 2) such that the projecting board 32 is exposed, and the projecting board assembly 3 is at the displaying position B.

In the present embodiment, the driving mechanism 5 (see FIG. 5) comprises a motor 51, a first gear set 52, a swing arm 53, and a second gear set 54. The first gear set 52 has a transmission shaft 521. One end of the swing arm 53 is connected to the transmission shaft 521, such that the one end of the swing arm 53 can be connected to the motor 51 through the first gear set 52. The other end of the swing arm 53 may be connected to the holder 31 of the projecting board assembly 3 through the second gear set 54, such that the force of the motor 51 can be transmitted to the projecting board assembly 3 sequentially through the first gear set 52, the swing arm 53 and the second gear set 54, so as to use the driving mechanism 5 for driving the projecting board assembly 3 to rotate upwards and extend outward to the displaying position B, or rotate downwards and retract into the storing position A. In the present embodiment, the swing arm 53 is a rotary driving member, which may, of course, be replaced by a linear driving member.

The constructions of the first gear set 52 and the second gear set 54 are not limited and can vary as required. In the present embodiment, the second gear set 54 comprises a first rack 541, a second rack 542, and a gear 543. The first rack 541 and the second rack 542 are arc-shaped. The first rack 541 is fixed to the other end of the swing arm 53. The second rack 542 is fixed to one end of the holder 31. The gear 543 is appropriately pivoted in the base 2. The second rack 542 is engaged to the gear 543. The first rack 541 may be selectively engaged to the gear 543 along with swinging of the swing arm 53, so as to use the swinging of the swing arm 53 to drive the first rack 541 to drive the gear 543 to rotate, and in turn using the gear 543 to drive the second rack 542 to drive the projecting board assembly 3 to rotate upwards and extend out to the displaying position B or rotate downwards and retract into the storing position A.

In the present embodiment, the housing 1 is formed with a connecting groove 12 (also see FIG. 2). The connecting groove 12 may be parallel to the first guiding groove 61. The protecting cover 4 has a connecting post 41. The connecting post 41 is slidably disposed in the connecting groove 12. The other end of the swing arm 53 has a hook 531. The hook 531 is movably disposed at the other end of the swing arm 53. The hook 531 is hooked onto the connecting post 41 such that the swing arm 53 is connected to the protecting cover 4. Specifically, the hook 531 is connected to a slider 532. The slider 532 is slidably disposed on the swing arm 53, such that the hook 531 is movably disposed at the other end of the swing arm 53. A side of the hook 531 is formed with a through hole 533 for accommodating the connecting post 41, such that the hook 531 can be selectively hooked onto the connecting post 41. The hook 531 may be connected to or separated from the connecting post 41, such that the swing arm 53 is selectively connected to the protecting cover 4.

A third guiding mechanism 9 is further disposed between the swing arm 53 and the base 2 (also see FIG. 2), for guiding the swing arm 53 to swing stably. In the present embodiment, the third guiding mechanism 9 comprises a third guiding groove 91 and a third guiding post 92. The third guiding groove 91 is disposed at the base 2. The third guiding post 92 is disposed at the swing arm 53. The third guiding post 92 is slidably disposed in the third guiding groove 91, such that the swing arm 53 can swing stably. In the present embodiment, two swing arms 53, 53' are arranged. The two swing arms 53, 53' are linked through the transmission shaft 521 and can thus swing synchronously. The two swing arms 53, 53' are connected to the protecting cover 4 and thus can drive the protecting cover 4 to move more stably.

A fourth guiding mechanism 10 can be further disposed between the slider 532 and the base 2 (also see FIG. 2), for guiding the slider 532 and the hook 531 to move stably. In the present embodiment, the fourth guiding mechanism 10 comprises a fourth guiding groove 101 and a fourth guiding post 102. The fourth guiding groove 101 is disposed at the base 2. The fourth guiding post 102 is disposed at the slider 532. The fourth guiding post 102 is slidably disposed in the fourth guiding groove 101, such that the slider 532 and the hook 531 can move stably.

Referring to FIG. 6, when the projecting board assembly 3 of the present invention is not being used and is accommodated at the storing position A, the protecting cover 4 only covers the projecting board 32 of the projecting board assembly 3, namely, the protecting cover 4 only covers an active region of the projecting board assembly 3. At this moment, the driving mechanism 5 is disconnected, namely, the first rack 541 and the gear 543 are separated from each other, so a driving force can only act on the protecting cover 4 but not the holder 31 of the projecting board assembly 3, namely, no driving force is transmitted to the holder 31 of the projecting board assembly 3.

Figure 7:
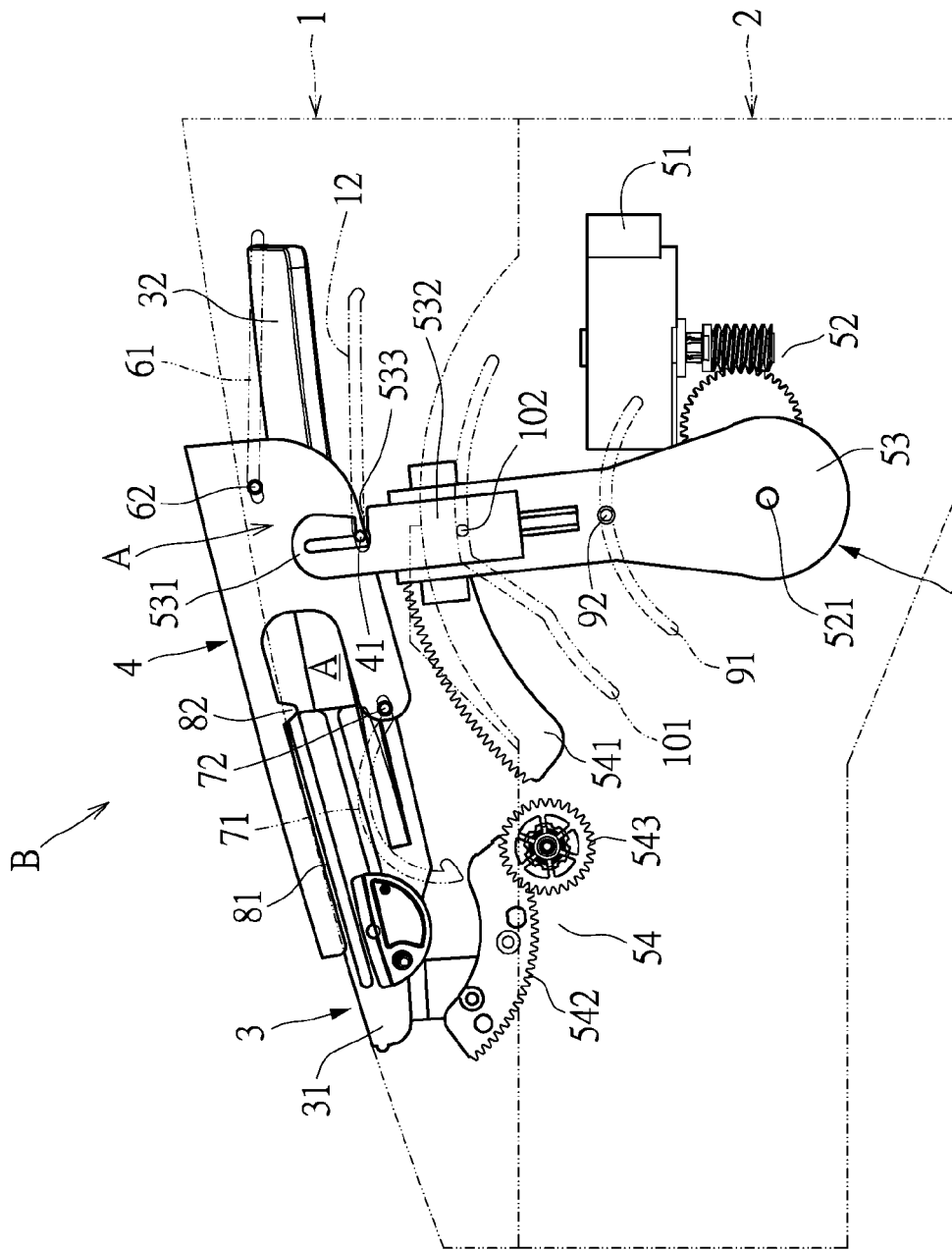
FIG. 7 is a schematic diagram (2) illustrating the action of the HUD device of the present invention.

Referring to FIG. 7, when rotating in an anticlockwise direction, the swing arm 53 of the driving mechanism 5 can drive the protecting cover 4 to move a distance. At the beginning of motion, the protecting cover 4 only allows some regions of the projecting board 32 to be open, such that an upper half of the projecting board 32 is exposed. At this moment, the first guiding mechanism 6 (also see FIG. 2) guides the protecting cover 4 to move on the projecting board assembly 3. Then, the protecting cover 4 can be engaged to the holder 31 of the projecting board assembly 3 through the engagement mechanism 8 (also see FIG. 4), namely, the engagement pin 82 disposed at the protecting cover 4 moves into the engagement groove 81 disposed at the holder 31 of the projecting board assembly 3, such that the protecting cover 4 is engaged to the holder 31 of the projecting board assembly 3, wherein the engagement pin 82 is movable in the engagement groove 81.

Figure 8:
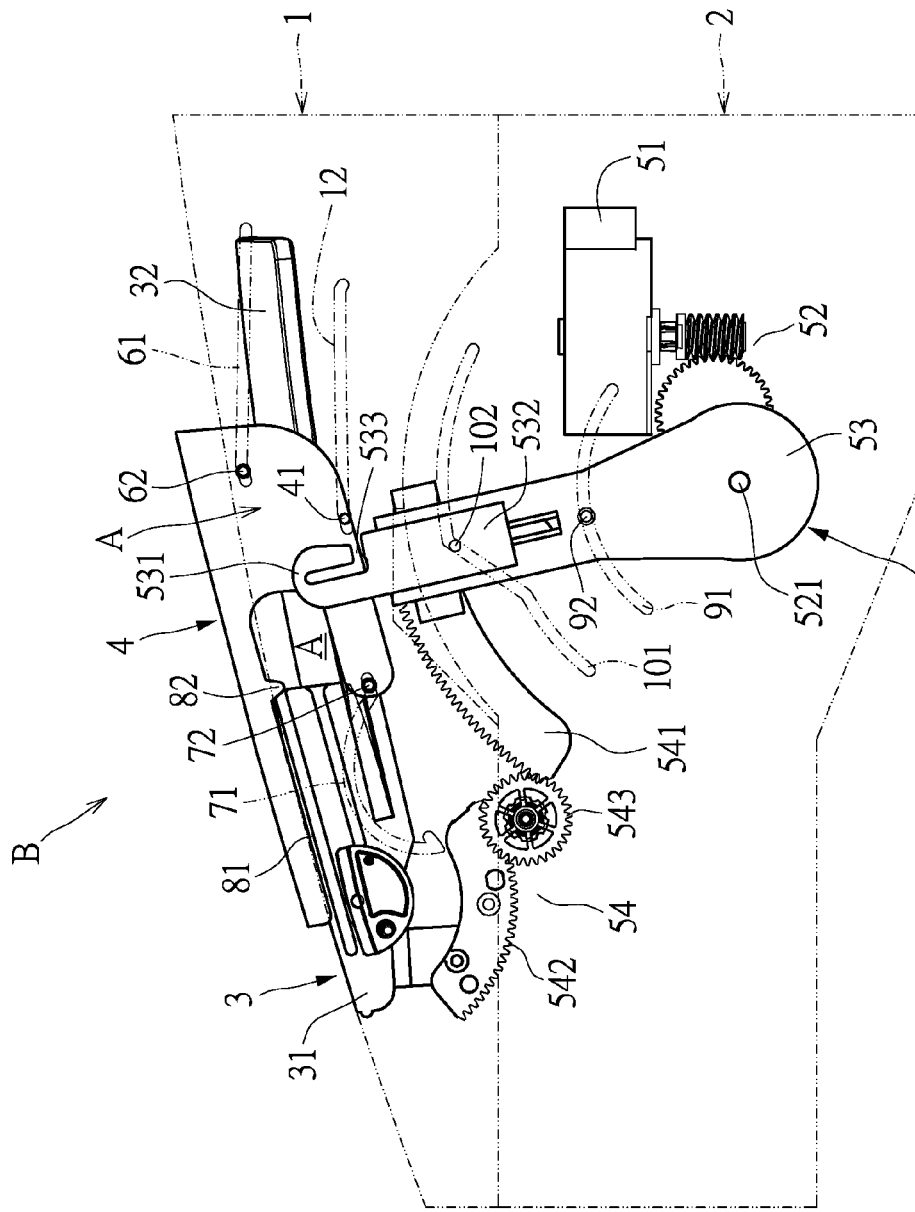
FIG. 8 is a schematic diagram (3) illustrating the action of the HUD device of the present invention.

Referring to FIG. 8, the first rack 541 is engaged to the gear 543 such that the force of the driving mechanism 5 engages the holder 31 of the projecting board assembly 3. The driving force of the driving mechanism 5 will be translated to rotate the projecting board assembly 3.

Figure 9:
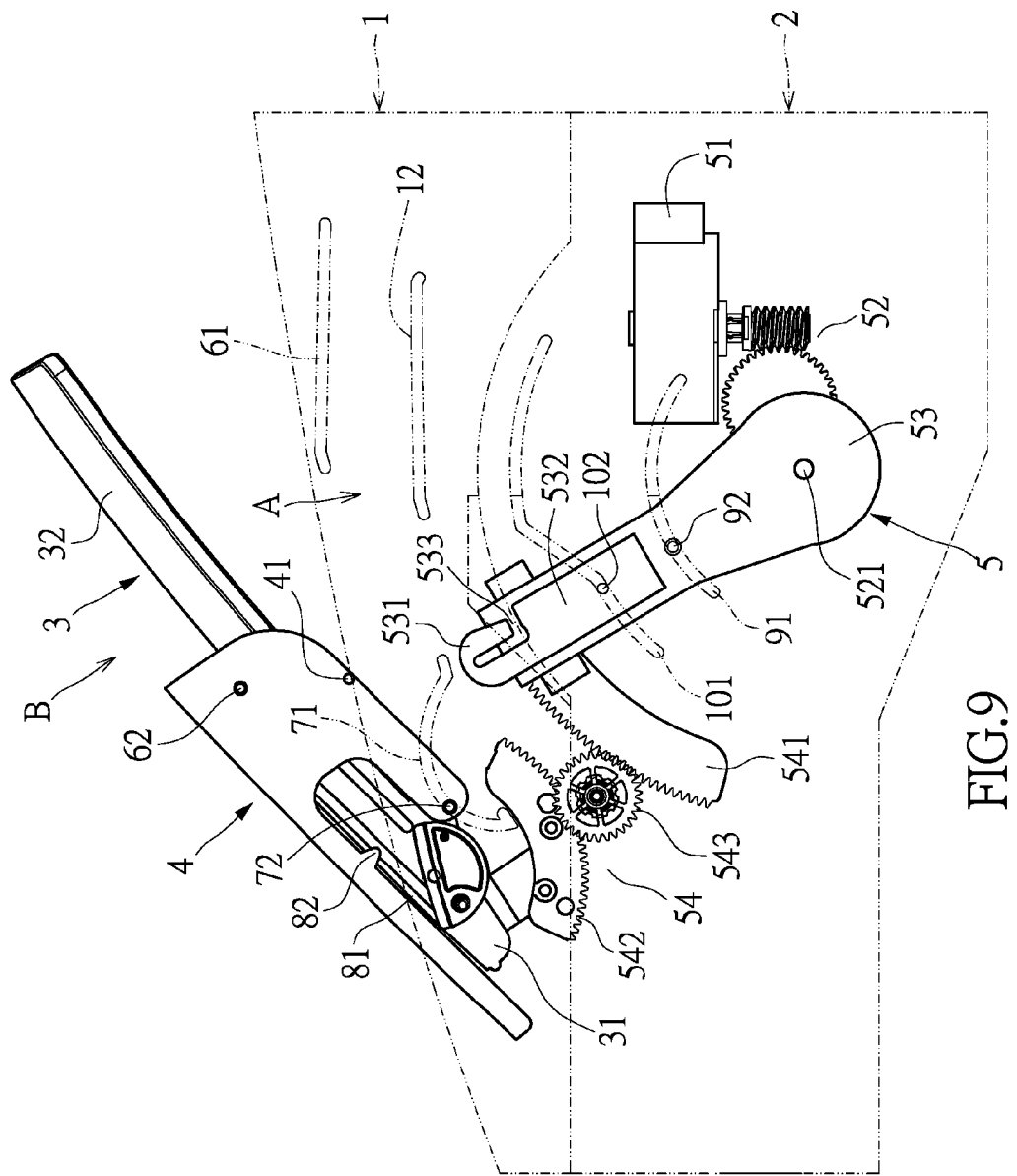
FIG. 9 is a schematic diagram (4) illustrating the action of the HUD device of the present invention.

Referring to FIG. 9, at this moment, the driving mechanism 5 is disengaged from the protecting cover 4, namely, the hook 531 of the swing arm 53 may be separated from the connecting post 41. At the same time, the protecting cover 4 is controlled by the projecting board assembly 3 and the second guiding mechanism 7 (also see FIG. 2) guides the protecting cover 4 to move on the projecting board assembly 3. The projecting board assembly 3 begins to rotate and is located at the displaying position B through the driving mechanism 5. At the same time, the protecting cover 4 is pulled down under guidance of the second guiding mechanism 7 such that the entire projecting board 4 is exposed.

As such, when the projecting board assembly 3 of the present invention is not being used and is accommodated at the storing position A, the driving mechanism 5 may be disconnected such that the driving force can only act on the protecting cover 4 but not the holder 31 of the projecting board assembly 3, namely, no driving force is transmitted to the holder 31 of the projecting board assembly 3. Therefore, at the beginning of motion, the protecting cover 4 only allows some regions of the projecting board 32 to be open and then is engaged to the holder 31 of the projecting board assembly 3. Then, the force of the driving mechanism 5 engages the holder 31 of the projecting board assembly 3, and the driving mechanism 5 is disengaged from the protecting cover 4, such that the projecting board assembly 3 begins to rotate and is located at the displaying position B through the driving mechanism 5. At the same time, the protecting cover 4 is pulled down such that the entire projecting board 4 is exposed.

The projecting board assembly 3 of the present invention comprises the holder 31 and the projecting board 32. The protecting cover 4 can cover the projecting board 32 of the projecting board assembly 3, thereby achieving the effect of protecting the projecting board 32 to prevent the projecting board 32 from being exposed to sunshine or adhered with dust. Since the protecting cover 4 only covers the projecting board 32 of the projecting board assembly 3 and the projecting board 32 has a small area, the protecting cover 4 is more easily disposed and driven, thereby simplifying the structure and reducing cost.

Moreover, the second guiding mechanism 7 is disposed between the protecting cover 4 of the present invention and the housing 1. When the driving mechanism 5 drives the projecting board assembly 3 to move towards the displaying position B, the protecting cover 4 can be pulled down under guidance of the second guiding mechanism 7 to expose the projecting board 32. Therefore, the protecting cover 4 can be driven without other driving mechanisms, further simplifying the structure and reducing cost.

The description above is only a preferred embodiment of the present invention and is not intended to limit the scope of the present invention. All equivalent changes made according to the specification and drawings of the present invention should fall within the scope of the present invention.

What is claimed is:

1. A head-up display (HUD) device, comprising:
   a housing, formed with an opening;
   a base, disposed below the housing;
   a projecting board assembly, comprising a holder and a projecting board, the projecting board being disposed on the holder;
   a protecting cover, movably disposed on the projecting board assembly, the protecting cover being configured to cover or expose the projecting board, and a first guiding mechanism and a second guiding mechanism being disposed between the protecting cover and the housing; and
   a driving mechanism, the projecting board assembly being rotatably disposed above the base through the driving mechanism, the driving mechanism being configured to drive the projecting board assembly to move between a storing position that is located at the opening of the housing and a displaying position that is located outside the housing, and the driving mechanism being selectively connected to the protecting cover;
   wherein the driving mechanism is configured to drive the protecting cover to move under guidance of the first guiding mechanism, engage the protecting cover to the holder of the projecting board assembly, and pull down the protecting cover under guidance of the second guiding mechanism for exposing the projecting board and positioning the projecting board assembly at the displaying position.

2. The HUD device of claim 1, wherein the first guiding mechanism comprises a first guiding groove and a first guiding post, the first guiding groove is disposed at the housing, the first guiding post is disposed at the protecting cover, and the first guiding post is slidably disposed in the first guiding groove.

3. The HUD device of claim 2, wherein the second guiding mechanism comprises a second guiding groove and a second guiding post, the second guiding groove is disposed at the housing, the second guiding post is disposed at the protecting cover, and the second guiding post is slidably disposed in the second guiding groove.

4. The HUD device of claim 1, wherein the driving mechanism comprises a motor, a first gear set, a swing arm, and a second gear set, one end of the swing arm is connected to the motor through the first gear set, and the other end of the swing arm is connected to the holder of the projecting board assembly through the second gear set.

5. The HUD device of claim 4, wherein the first gear set has a transmission shaft, and one end of the swing arm is connected to the transmission shaft, such that said one end of the swing arm is connected to the motor through the first gear set.

6. The HUD device of claim 4, wherein the second gear set comprises a first rack, a second rack, and a gear, the first rack and the second rack are arc-shaped, the first rack is fixed to the other end of the swing arm, the second rack is fixed to one end of the holder, the second rack is engaged to the gear, and the first rack is selectively engaged to the gear along with swinging of the swing arm.

7. The HUD device of claim 4, wherein a third guiding mechanism is disposed between the swing arm and the base, for guiding the swinging of the swing arm.

8. The HUD device of claim 4, wherein the housing is formed with a connecting groove, the protecting cover has a connecting post, the connecting post is slidably disposed in the connecting groove, and a hook is movably disposed at the other end of the swing arm, and the hook is selectively hooked onto the connecting post, such that the swing arm is selectively connected to the protecting cover.

9. The HUD device of claim 8, wherein the hook is connected to a slider, the slider is slidably disposed on the swing arm, one side of the hook is formed with a through hole for the connecting post to pass through, and a fourth guiding mechanism is disposed between the slider and the base, for guiding the slider and the hook to move.

10. The HUD device of claim 1, wherein an engagement mechanism is disposed between the protecting cover and the holder of the projecting board assembly to selectively engage the protecting cover to the holder of the projecting board assembly.

11. The HUD device of claim 10, wherein the engagement mechanism comprises an engagement groove and an engagement pin, the engagement groove is disposed at the holder of the projecting board assembly, the engagement pin is disposed at the protecting cover, and the engagement pin is selectively moved into the engagement groove to engage the protecting cover to the holder of the projecting board assembly.

12. A head-up display (HUD) device, comprising:
   a housing, formed with an opening;
   a projecting board assembly, comprising a holder and a projecting board, the projecting board being disposed on the holder, wherein the projecting board assembly is displaceable between a storing position and a displaying position, wherein when the projecting board assembly is located at the storing position, the projecting board is retracted within the housing, and wherein when the projecting board assembly is located at the displaying position, the projecting board is extended outside the housing through the opening;
   a protecting cover, configured to at least partially cover the opening, wherein an engagement mechanism is disposed between the protecting cover and the holder of the projecting board assembly to selectively engage the protecting cover to the holder of the projecting board assembly; and
   a driving mechanism, configured to drive the protecting cover to move, engage the protecting cover to the holder of the projecting board assembly through the engagement mechanism, and drive the projecting board assembly to move from the storing position to the displaying position.

13. The HUD device of claim 12, wherein the engagement mechanism comprises an engagement groove and an engagement pin, the engagement groove is disposed at the holder of the projecting board assembly, the engagement pin is disposed at the protecting cover, and the engagement pin is selectively moved into the engagement groove to engage the protecting cover to the holder.

14. The HUD device of claim 12, wherein when the projecting board assembly is located at the storing position, the projecting board disengages from the holder.

15. The HUD device of claim 12, wherein when the projecting board assembly is driven to move from the storing position to the displaying position, the protecting cover engages the holder through the engagement mechanism and the projecting board assembly drives the protecting cover to move synchronously.

16. A head-up display (HUD) device, comprising:
   a housing, formed with an opening;
   a projecting board assembly, comprising a holder and a projecting board, the projecting board being disposed on the holder, wherein the projecting board assembly is displaceable between a storing position and a displaying position, wherein when the projecting board assembly is located at the storing position, the projecting board is retracted within the housing, and wherein when the projecting board assembly is located at the displaying position, the projecting board is extended outside the housing through the opening;

a protecting cover, configured to at least partially cover the opening, and a first guiding mechanism and a second guiding mechanism being disposed between the protecting cover and the housing; and a driving mechanism, configured to drive the protecting cover to move under guidance of the first guiding mechanism and drive the protecting cover to rotate under guidance of the second guiding mechanism for exposing the opening such that the projecting board is extended outside the housing through the opening;

wherein the first guiding mechanism comprises a first guiding groove and a first guiding post, the first guiding groove is disposed at the housing, the first guiding post is disposed at the protecting cover, and the first guiding post is slidably disposed in the first guiding groove.

17. The HUD device of claim 16, wherein the second guiding mechanism comprises a second guiding groove and a second guiding post, the second guiding groove is disposed at the housing, the second guiding post is disposed at the protecting cover, and the second guiding post is slidably disposed in the second guiding groove.

18. The HUD device of claim 16, wherein the driving mechanism comprises a motor, a gear set, and a swing arm, the motor is configured to drive the swing arm to rotate through the gear set, the swing arm is connected to the protecting cover, and the driving mechanism is configured to drive the protecting cover to move through the swing arm.

* * * * *